(No Model.) 2 Sheets—Sheet 2.
E. Y. BURGAN.
CHECK ROWER FOR CORN PLANTERS.
No. 278,090. Patented May 22, 1883.
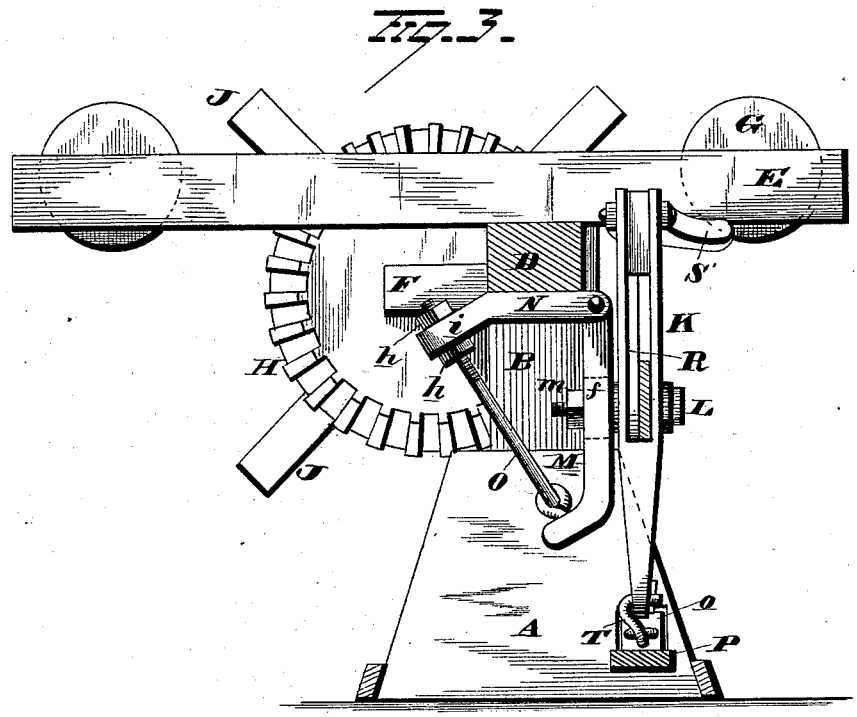
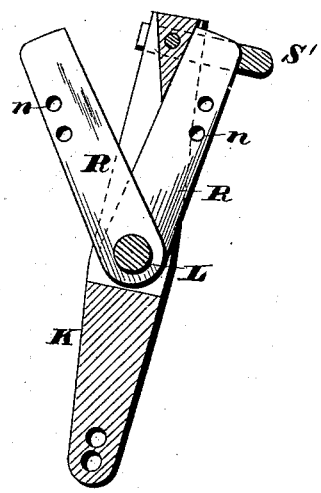
WITNESSES
S. J. Nottingham
Geo. F. Downing
INVENTOR
E. Y. Burgan
B. H. A. Symon,
Attorney

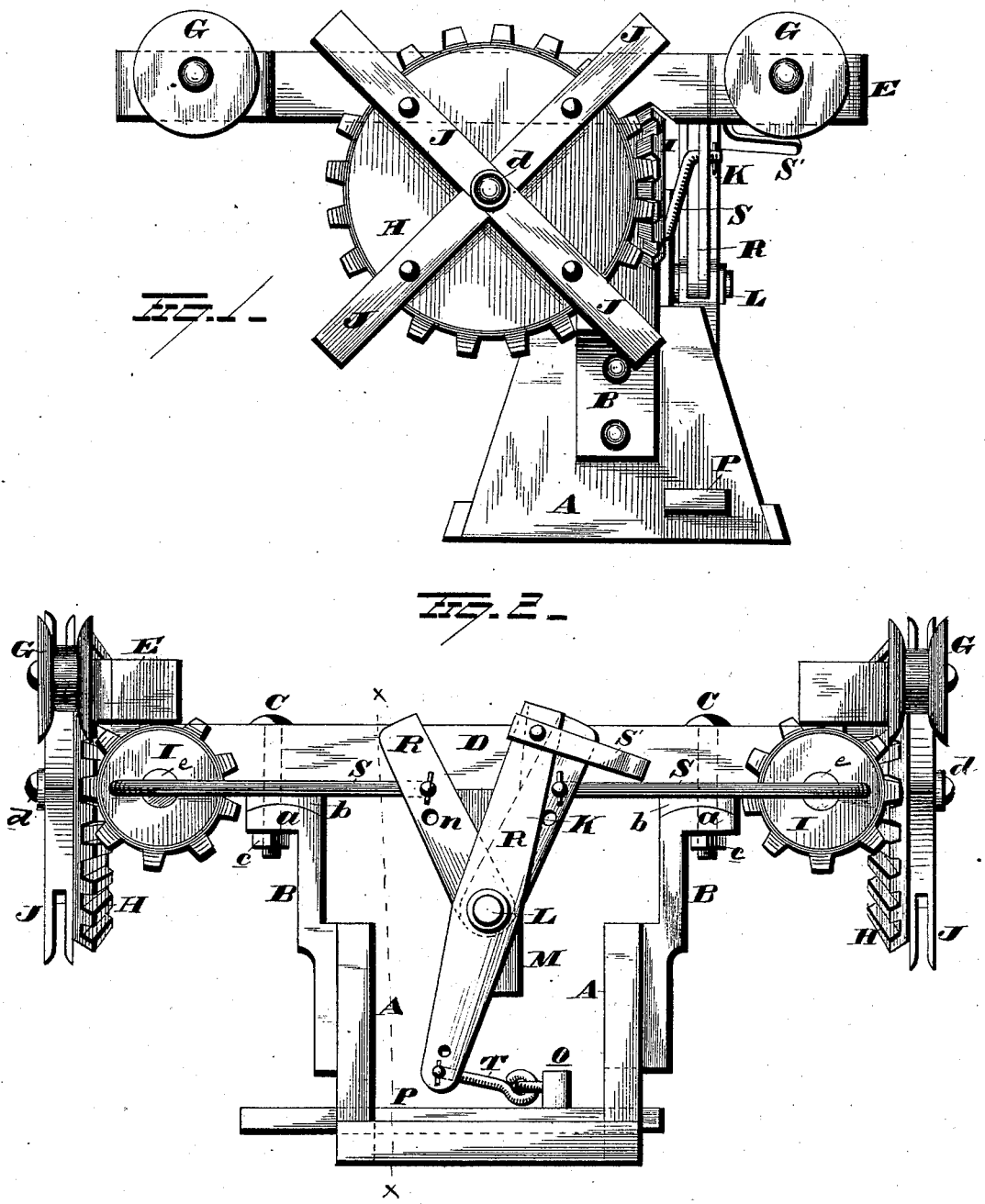

UNITED STATES PATENT OFFICE.

ELMORE Y. BURGAN, OF CORNING, IOWA.

CHECK-ROWER FOR CORN-PLANTERS.

SPECIFICATION forming part of Letters Patent No. 278,090, dated May 22, 1883.

Application filed October 7, 1882. (No model.)

*To all whom it may concern:*

Be it known that I, ELMORE Y. BURGAN, of Corning, in the county of Adams and State of Iowa, have invented certain new and useful Improvements in Check-Rowers for Corn-Planters; and I do hereby declare the following to be a full, clear, and exact description of the invention, such as will enable others skilled in the art to which it pertains to make and use the same.

My invention relates to an improvement in check-rowers for corn-planters of the kind that are operated to drop the seed by a line stretched across the field, and which shall be simple in construction, durable and efficient in use, and operated to be thrown out of gear or rendered inoperative while the machine is moving forward without disconnecting the line from the spoke-wheel; and with these ends in view my invention consists in certain details of construction and combination of parts, as will be more fully described, and pointed out in the claims.

In the accompanying drawings, Figure 1 is a view in side elevation of my improvement. Fig. 2 is a view of the same in rear elevation. Fig. 2 is a vertical sectional view of the same through the line *x x* of Fig. 2, and Fig. 4 is a detached view of the operating-lever with its pivoted side arm and latch.

In the drawings I have only shown, and in the specification will only describe, the parts material to my invention, they being adapted for use on all planters of ordinary construction.

A represents a seed-box of ordinary construction, provided with one or more openings for the discharge of grain.

B are the box-irons, rigidly secured to the sides of the seed-box and provided with curved upper ends, *a*, on which the caps *b* rest. The contiguous faces of the irons B and caps *b* are serrated or corrugated, so as to firmly hold the parts in position, and the said curved ends *a* are also provided with elongated slots, through which the bolts C pass. These bolts pass downward through the transverse bar B, caps *b*, and ends *a*, and are held in position by nuts *c*. By means of the oblong slot in the curved heads *a* the transverse bar D, with its connected parts, can be moved backward or forward over the seed-box, to accommodate itself to machines of different sizes. The transverse bar D is provided at opposite ends with the side arms, E, to which latter the pulleys G, over which the line-wire passes, are secured.

F are two small arms secured to the under side of the bar D, immediately under the side arms, E. These arms F are each provided on their outer faces with a spindle, *d*, for the attachment of the wheels H, and on their rear ends with a spindle, *e*, for the attachment of the small bevel-wheels I. The large wheels H on the sides of the machine are each provided with four spokes, J, which latter extend out beyond the peripheries of the wheels H, and are bifurcated at their outer ends for the passage of the line.

K is the operating or vibrating lever, loosely journaled about midway its length to the spindle L, which latter is adjustably secured in the oblong slot of the pivoted depending arm M by the nut *m*. This depending arm M is pivotally secured to the block N, which latter is secured to the under side of the transverse bar D, and is prevented from vibrating by means of the rod O and nuts *h*. This rod O is pivotally secured to the lower end of the depending arm M, and the upper end thereof is screw-threaded and passes through the inclined projection *i* of the block N. One of the nuts *h* is screwed onto this rod below the projection *i* and the other above the same, and by adjusting these nuts until the desired inclination of the depending arm has been secured, and then clamping them against the projection *i*, the said arm will be held rigidly in position while the machine is in operation. By means of the oblong slot *f* in the depending arm M, the spindle L, and nut *m* the lever K can be adjusted so as to adapt it to machines differing in distance between the bar D and the sliding bar P, and by means of the pivoted depending arm M and block O the lever K can be so inclined as to bring the lower end thereof directly over the slide-bar P. This lever K is provided with two pivoted side arms, R, to the upper ends of which the pitmen S are adjustably secured in the series of holes *n*, and connect the said lever to the small bevel-wheels I. The lever K is socketed or cut away, as shown in Fig.

4, and the lower ends of both arms R are pivotally secured in the said cut-away portion of the lever K to the spindle L, while the inner edges of both arms bear throughout a portion of their length against the opposite sides of the V-shaped partitions, which divide or separate the cut-away portion of the lever. As these arms are only pivotally secured to the lever K, they are free to be moved or vibrated without moving the operating-lever K, and consequently it is necessary to provide means for connecting either arm R to the lever K, as necessity demands. This is accomplished by the latch S', which is pivotally secured to the upper end of the lever K, being thrown over either arm, so as to secure it to the said lever and cause it to move simultaneously with the arm, which latter, when the machine is moving forward, is constantly in motion. The lower end of the lever K is connected to the block O of the lever P by the link T.

The operation of my improvement is as follows: The wire is anchored in the field and the machine connected thereto in the ordinary manner. Suppose, for the sake for convenience, the wire is connected to the left side of the machine. As the machine is moved forward one of the knobs on the wire engages one of the spokes J and turns the large bevel-wheel one-quarter round and brings the next spoke up in position to engage the next knob on the wire. As the large bevel-wheel has twice as many teeth as the small one, I, it follows that the said wheel I will be turned half around and the pitman connecting it to the left arm, R, of the lever K will be moved either inward or outward one full stroke, which drops the corn. As the next knob strikes the next spoke of the large bevel-wheel the motion of the left arm R is reversed, and so on continuously. The arm R on the left-hand side of the machine is locked to the lever K by the latch S', and the motion of the said arm is of necessity transmitted to the said lever K. While the arm on one side of the machine is in operation the arm on the other side is inoperative. When the wire is transferred to the right side of the machine the right arm would be locked to the lever K, and the opposite one would remain inoperative. When it is desired to pass over ground unsuitable for planting, it is only necessary to disconnect the operative arm R from the lever K by throwing up the latch S', which leaves the said arm free to vibrate independent of the lever.

I have shown bevel-wheels for operating the dropping mechanism and placed them in vertical position; but it is evident that pinions can be employed and placed horizontally and answer all necessary purposes.

I have also shown the spokes J rigidly secured to the large bevel-wheels; but it is apparent that they can be secured to an independent hub and perform their functions in a satisfactory manner.

Only one seed-box has been shown in the drawings, but two are usually employed, and in that case the lever K would be situated and move between them.

It is evident that slight changes in the construction and arrangement of the several parts might be resorted to without departing from the spirit of my invention; and hence I would have it understood that I do not limit myself to the exact construction of parts shown and described, but consider myself at liberty to make such changes and alterations as come within the scope of my invention.

What I claim is—

1. The combination, with the combined spoke and gear wheel and the gear-wheel I, of the vibrating lever, the side arms, a latch for connecting the side arms to the lever, and pitmen, substantially as set forth.

2. The combination, with the combined spoke and gear wheels and the gear-wheels I, of the adjustable vibrating lever pivotally secured on the spindle L, side arms pivotally secured on the same spindle, the latch for locking the side arms to the lever, and pitmen for connecting the wheels I to the side arms, substantially as set forth.

3. The combination, with the lever K, means for vibrating the same, and the slide-bar, of the pivoted depending arm, to which the said lever is secured, a rod pivotally secured at its lower end to the said depending arm, and passing upward in an inclined direction through the projection i, and nuts adapted to be screwed onto the said rod, respectively, above and below the said projection i, and hold the depending arm in any desired operative position.

4. The combination, with the depending arm, provided with an oblong slot, and means for adjustably holding the said arm in any desired operative position, of the lever K, adjustably secured in the oblong slot in the depending arm, for the purpose set forth.

5. The combination, with the seed-box, the irons B, bar D, interposed caps b, and the bolts C, of the adjustable vibrating lever K, side arms, R, latch S, and means for vibrating said lever, substantially as set forth.

6. The combination, with guiding-pulleys, combined spoke and gear wheels, bevel-wheels I, and pitmen, of the vibrating lever having side arms, R, and the latch pivotally secured to the said lever, and adapted to lock the side arms thereto, substantially as set forth.

7. The combination, with the operating-lever, having side arms pivotally secured thereto in the position shown, of the pitmen connected to the upper ends of the pivoted side arms, and means for connecting and disconnecting the side arms and operating-lever.

8. The combination, with the operating-lever, having side arms pivotally secured thereto, and the slide-bar, of the pitmen pivotally connected to the said operating-lever, and the latch S', for connecting and disconnecting the lever and arms.

9. The combination, with the spokes rigidly secured to bevel-wheels, the wheels I, and the pitmen, of the slide-bar P, the vibrating lever adjustably secured to the arm F, the side arms pivotally secured at their lower ends on the spindle L, and the latch pivotally secured to the vibrating lever, all of the above parts combined and adapted to operate as described.

10. The combination, with the pitmen and slide-bars, of the vibrating lever and side arms pivotally secured to the spindle L, and a latch for locking either side arm to the vibrating lever, all of the above parts combined and adapted to operate as described.

11. The combination, with the block N and arm M, of the pitmen, vibrating lever, side arms, slide-bar, latch, and adjustable spindle L, all of the above parts combined and adapted to operate as described.

In testimony whereof I have signed this specification in the presence of two subscribing witnesses.

ELMORE Y. BURGAN.

Witnesses:
   H. C. RAWSON,
   OREN BURGAN.